(12) United States Patent
Roke et al.

(10) Patent No.: US 7,247,007 B2
(45) Date of Patent: Jul. 24, 2007

(54) LINEAR COMPRESSOR

(75) Inventors: Lindsey Jack Roke, Auckland (NZ); Ian Campbell McGill, Auckland (NZ); Gerald David Duncan, Auckland (NZ); William George Ferguson, Auckland (NZ); Andrew Paul Taylor, Auckland (NZ)

(73) Assignee: Fisher & Paykel Appliances Limited, Auckland (NZ)

( * ) Notice: Subject to any disclaimer, the term of this patent is extended or adjusted under 35 U.S.C. 154(b) by 352 days.

(21) Appl. No.: 11/042,234

(22) Filed: Jan. 25, 2005

(65) Prior Publication Data

US 2005/0158193 A1    Jul. 21, 2005

Related U.S. Application Data

(62) Division of application No. 10/110,886, filed as application No. PCT/NZ00/00202 on Oct. 17, 2000.

(30) Foreign Application Priority Data

Oct. 21, 1999   (NZ)   .................... 500681
Oct. 21, 1999   (NZ)   .................... 500683

(51) Int. Cl.
    *F04B 17/03*    (2006.01)
    *F16F 1/06*    (2006.01)

(52) U.S. Cl. ............ 417/417; 267/174; 267/180

(58) Field of Classification Search ........ 417/416, 417/417; 267/166, 179, 180, 182, 170, 174
See application file for complete search history.

(56) References Cited

U.S. PATENT DOCUMENTS

| | | | |
|---|---|---|---|
| 552,845 A | 1/1896 | Lewis et al. | |
| 895,492 A * | 8/1908 | Neate | 267/166.1 |
| 3,329,334 A | 7/1967 | Curwen | |
| 3,439,960 A | 4/1969 | Guyon et al. | |
| 3,947,155 A | 3/1976 | Bidol | |

(Continued)

FOREIGN PATENT DOCUMENTS

GB    2246176    1/1992

(Continued)

OTHER PUBLICATIONS

A copy of the paper "Vibration Characteristics of Small Rotary and Linear Cryogenic Coolers for IR Systems" (12 pages) by W.J. Gully and M.W. Hanes of G.M. Hughes, 1990.

*Primary Examiner*—Charles G. Freay
(74) *Attorney, Agent, or Firm*—Trexler, Bushnell, Giangiorgi, Blackstone & Marr, Ltd.

(57) ABSTRACT

A linear compressor includes a cylinder part and a piston part. A spring connects the cylinder part and the piston part and operates in the direction of reciprocation of the piston part relative to the cylinder part. The piston part includes a radially compliant but axially stiff linkage and piston. The cylinder part includes a cylinder and a cylinder liner therewithin. A bore runs through the cylinder liner and the piston reciprocates in the bore. Gas bearing passages are formed between the cylinder and the cylinder liner leading to opening through the wall of the cylinder liner to the bore. A gas bearing manifold receives compressed gases and supplies the compressed gases to the gas bearing passages. The gas bearing passages follow a tortuous path to the openings.

34 Claims, 5 Drawing Sheets

U.S. PATENT DOCUMENTS

| | | |
|---|---|---|
| 4,150,924 A | 4/1979 | Toyoda |
| 4,545,738 A | 10/1985 | Young |
| 4,644,851 A | 2/1987 | Young |
| 5,257,915 A | 11/1993 | Laskaris et al. |
| 5,525,845 A | 6/1996 | Beale et al. |
| 5,791,638 A | 8/1998 | Balsells |
| 5,878,998 A | 3/1999 | Hsieh |
| 5,993,175 A | 11/1999 | Kim |
| 5,993,178 A | 11/1999 | Park et al. |
| 6,174,141 B1 | 1/2001 | Song et al. |
| 6,202,791 B1 | 3/2001 | Oh et al. |
| 6,293,184 B1 | 9/2001 | Unger |
| 6,341,767 B1 * | 1/2002 | Seale et al. ................ 267/169 |

FOREIGN PATENT DOCUMENTS

| | | |
|---|---|---|
| JP | 11117861 | 4/1999 |
| JP | 02002122071 | 4/2002 |

* cited by examiner

LINEAR COMPRESSOR

This application is a divisional application of U.S. patent application Ser. No. 10/110,886, which was accorded a filing date under 35 U.S.C. §371 of Jul. 15, 2002, which is the National Stage of International Application No. PCT/NZ00/00202 which has an international filing date of Oct. 17, 2000 and which was published in English on Apr. 26, 2001 under International Publication Number WO 01/29444.

BACKGROUND TO THE INVENTION

1. Field of the Invention

The present invention relates to a linear compressor, particularly but not solely for use in refrigerators.

2. Summary of the Prior Art

Compressors, in particular refrigerator compressors, are conventionally driven by rotary electric motors. However, even in their most efficient form, there are significant losses associated with the crank system that converts rotary motion to linear reciprocating motion. Alternatively a rotary compressor which does not require a crank can be used but again there are high centripetal loads, leading to significant frictional losses. A linear compressor driven by a linear motor would not have these losses, and can be designed with a bearing load low enough to allow the use of aerostatic gas bearings as disclosed in U.S. Pat. No. 5,525,845, where a connecting rod that is compliant to lateral movement allows for the low bearing load.

A discussion of aerostatic gas bearings is included in "Design of Aerostatic Bearings", J. W. Powell, The Machinery Publishing Company Limited, London 1970. However with normal manufacturing tolerances and equipment production of effective gas bearings is difficult.

Conventional compressors are mounted within a hermetically sealed housing which in use acts as a reservoir of refrigerant gas. Refrigerant gas is drawn into the compressor from this reservoir and is exhausted through an exhaust conduit leading from the compressor, through the housing.

Operation of the compressor involves the reciprocation of moving parts leading to vibration of the compressor unit, in all three axis. To reduce the external noise effect of this vibration the compressor is mounted on isolation springs within the sealed housing.

With a linear compressor the piston vibrates relative to the cylinder in only one axis, with consequent reaction forces on whichever part, if either, is fixed. One solution proposed to this problem is to operate a pair of compressors synchronously in a balanced and opposed configuration. However this arrangement would be too complex and costly for use in a commodity item such as a domestic refrigerator. Another proposed solution is the addition of a resonant counterweight to reduce the vibration. However this approach limits the operation of the compressor because the counterweight is a negative feedback device and is limited to the fundamental unbalance force. A further solution is proposed in "Vibration characteristics of small rotary and linear cryogenic coolers for IR systems", Gully and Hanes, Proceedings of the 6$^{th}$ International Cryocooler Conference, Plymouth, Mass., 1990. This solution involves independently supporting the piston part and the cylinder part of the compressor within the housing so that the "stator acts as a counterweight". However in implementing this design in a domestic refrigerator there is a problem when the piston mass is low. In such a compressor, as the discharge pressure increases, the force of the compressed gas acts as a spring force (the "gas spring") which increases the running speed as the discharge pressure increases. This is a problem because the frequency of the "third" vibration mode (where the piston and the cylinder vibrate in phase with each other but out of phase with the compressor shell) is only slightly above the frequency of the desirable "second" mode (where the shell does not vibrate and the piston and cylinder are out of phase). Thus the shell starts to vibrate intolerably as the "gas spring" starts to operate and effectively raises the "second" mode frequency to, and eventually above, the "third" mode frequency.

SUMMARY OF THE INVENTION

It is an object of the present invention to provide a compact linear compressor which goes some way to overcoming the abovementioned disadvantages.

Accordingly in a first aspect the present invention consists in a linear compressor including:

a cylinder part, a piston part, a main spring connecting between said cylinder part and said piston part and operating in the direction of reciprocation of said piston part relative to said cylinder part, a sealed housing, a linear electric motor arranged for operation between said cylinder part and said piston part, a cylinder part spring means connecting between said cylinder part and said housing part and operating in said direction of reciprocation; and a piston part spring means connecting between said piston part and said housing and operating elastically in said direction of reciprocation, said piston part spring means having a spring constant which is the product of the fraction of said piston part mass to said cylinder part mass and the effective spring constant of said cylinder part spring means acting in said direction of reciprocation.

In a still further aspect the invention consists in a spring (particularly suited for linear compressors) having a pair of first mounting points for securement to a first body, and at least one second mounting point for securement to a second body reciprocable relative to said first body, and a spring arm spanning a path between said first mounting points by way of said second mounting point, at least a first section having a curve around one of said first mounting points and a second section having a curve around another said first mounting point, said first section and said second section meeting between said first mounting points at said second mounting point.

Accordingly in a first aspect the present invention consists in a linear compressor having a linear compressor having a piston part and a cylinder part reciprocal relative to one another, and a main spring having at least a pair of first mounting points for securement of said spring to a first body, and at least one second mounting point for securement to a second body reciprocable relative to said first body, and a spring arm spanning a path between said first mounting points by way of said second mounting point, at least a first section having a curve around one said first mounting point and a second section having a curve around another said first mounting point, said first section and said second section meeting between said first mounting points at said second mounting point, said main spring connecting between said piston part and said cylinder part.

In a still further aspect the invention consists in a linear compressor including:

a cylinder part, a piston part, a main spring connecting between said cylinder part and said piston part and operating in the direction of reciprocation of said piston part relative to said cylinder part, a sealed housing, a linear electric motor arranged for operation between said cylinder part and said piston part, a cylinder part spring means connecting between said cylinder part and said housing part and operating in said direction of reciprocation, and a piston part spring means connecting between said piston part and said housing and operating elastically in said direction of reciprocation, said piston part spring means having a spring constant which is the product of the fraction of said piston part mass to said cylinder part mass and the effective spring constant of said cylinder part spring means acting in said direction of reciprocation.

In a further aspect the invention consists in a linear compressor including a spring connecting between a first body and a second body intended to reciprocate along a first direction relative to said first body, said spring comprising:

at least one first mounting point mounted to said first body, at least one second mounting point mounted to said second body, a first spring arm connecting between a said first mounting point and a said second mounting point, said first spring arm including a radial section extending substantially perpendicular to said direction of reciprocation, a large radius curve of substantially constant curvature and, between said radial section and said large radius curve, a tighter curve than said large radius curve, a second spring arm connecting between a said first mounting point and a said second mounting point, said second spring arm including a radial section extending substantially perpendicular to said axis of reciprocation, a large radius curve of substantially constant curvature and, between said radial section and said large radius curve, a tighter curve than said large radius curve, said first spring arm and said second spring arm each shaped such that for the respective said spring arm, when the shape is projected onto a plane perpendicular to said direction of reciprocation and including said radial section, said radial section extends substantially radially relative to said large radius curve at at least one of the said first mounting point and said second mounting point, with the respective said mounting point at or close to the centre of curvature of said large radius curve.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

DETAILED DESCRIPTION

Figure 1:
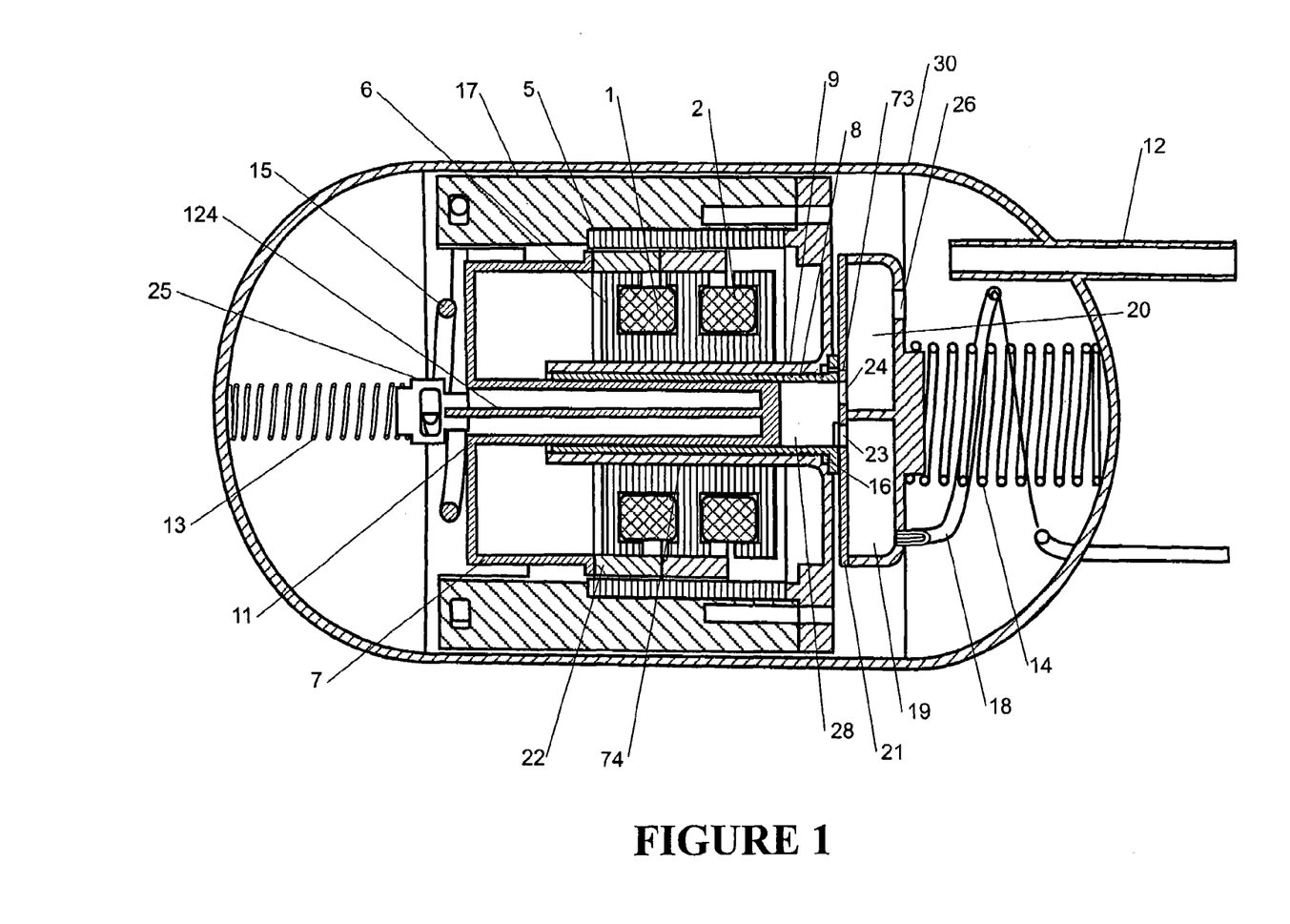
FIG. 1 is a cross-section of a linear compressor according to the present invention.

A practical embodiment of the invention, shown in FIG. 1, involves a permanent magnet linear motor connected to a reciprocating free piston compressor. The cylinder 9 is supported by a cylinder spring 14 and by a discharge tube 18 within the compressor shell 30. The piston 11 is supported radially by the bearing formed by the cylinder bore plus its spring 13 via the spring mount 25. A main spring 15 connects between the piston part 11 and the cylinder part 9. The total reciprocating movement is the sum of the movement of the piston 11 and the cylinder 9.

This reciprocating movement draws gas in through a suction tube 12 through a suction port 26 through a suction muffler 20 and through a suction valve port 24 in a valve plate 21 into a compression space 28. The compressed gas then leaves through a discharge valve port 23, is silenced in a discharge muffler 19, and exits through a discharge tube 18.

The cylinder 9 is supported by the discharge tube 18 and the cylinder spring 14 which have a combined stiffness, $k_{cylinder}$, in the axial direction. The piston 11 is supported radially by gas bearings which will be described later. During resonant oscillation of the piston and cylinder the main spring has a stiffness, $k_{main}$, such that the second mode resonant frequency, $f_n$ $f_{natural}$, can be estimated from the relation, $$f_{natural} = \frac{1}{2 \cdot \pi} \cdot \sqrt{k_{main} \cdot \frac{m_{piston} + m_{cylinder}}{m_{piston} \cdot m_{cylinder}}}$$

Where $m_{piston}$, $m_{cylinder}$, are the sprung masses of the piston and cylinder springs, $f_n$ $f_{natural}$ is usually 10 to 20 Hz less than the desired running frequency to allow for the increase in frequency due to the stiffness of the compressed gas, the effective cylinder spring (a combination of spring 14 and 18), and piston spring 13. The stiffness of the piston spring $k_{piston}$ is selected according to the relationship $$k_{piston} = k_{cylinder} \times \frac{m_{piston}}{m_{cylinder}}$$

The spring forces are transferred to the piston via the rod end 25 and the radially compliant piston rod 124. The electromagnetic forces are transferred to the piston via the piston flange 7, from the bi-polar magnets 22. The bi-polar magnets 22 are bonded to each other and to the piston flange 7.

The compressor motor comprises a two part stator and an armature. The stator includes an inner stator 6 and a back iron 5. The inner stator carries coils 1 and 2. The armature includes bi-polar magnets 22. The magnetic interaction of the stator 5, 6 and armature magnets 22 generates reciprocating force on the piston 11 (attached to the armature by flange 7).

An oscillating current in coils 1 and 2, not necessarily sinusoidal, will give rise to substantial movement of the piston 11 relative to the cylinder 9 provided the oscillation frequency of the current is close to the natural resonant frequency of the mechanical system. This oscillating force creates a reaction force on the stator parts. Thus the inner stator 6 must be rigidly attached to the cylinder 9 by adhesive, shrink fit or clamp etc. The back iron 5 is clamped or bonded to the stator mount 17.

The stator mount 17 also clamps the outer ends of the main spring 15 and also keeps the relatively back iron 5 stator round and concentric with the inner stator 6. The entire compressor assembly is hermetically sealed inside the compressor shell 30.

In the present invention it is proposed that the main spring 15 has a stiffness much greater than the stiffness of the effective cylinder spring, and of the piston spring. This "main spring" raises the "second" mode frequency above the "third" so that the "gas spring" then only separates the modal frequencies further.

The actual running frequency (the "second" mode frequency) is determined by a complicated relation using the mass of piston and cylinder and the stiffness of the piston spring, cylinder spring, and main spring 15. Also, when the discharge pressure is high the equivalent spring stiffness of the compressed gas must be added to that of the main spring. However, with the cylinder spring quite soft (say with a stiffness 1/100 of the main spring) the running frequency is found reasonably accurately by:

$$f_{running} = \frac{1}{2 \cdot \pi} \cdot \sqrt{(k_{main} + k_{gas}) \cdot \frac{m_{piston} + m_{cylinder}}{m_{piston} \cdot m_{cylinder}}}$$

External vibration due to sources, other than from the desirable second mode due to piston/cylinder movement, can be almost eliminated by reducing the oscillating mass and by ensuring that the piston and cylinder springs are relatively soft. The effective cylinder spring stiffness can be reduced to a minimum by having no cylinder spring at all, leaving only the inherent stiffness (from around 1000 N/m) of the discharge tube 18 (or where a cooling tube is used the stiffness of both discharge and cooling tube are combined ie 2000 N/m). With the effective cylinder spring stiffness only including the stiffness of the discharge tube (say 1000 N/m) the stiffness of the piston spring should be:

$$k_{piston} = \frac{m_{piston}}{m_{cylinder}} \times 1000$$

For a ten to one cylinder to piston mass ratio this suggests a very soft piston-spring (100 N/m).

For the compressor with a main spring to resonate at roughly 75 Hz with a piston mass of around 100 g and a ten to one cylinder to piston mass ratio, the main spring stiffness ($k_{main}$) needs to be about 20,000 N/m. Typically the value of the gas spring will be lower than that of the main spring but not substantially lower. In the above case the running frequency is expected to be 99 Hz with the gas spring ($k_{gas}$) approximately 15,000 N/m.

The piston 11 is supported radially within the cylinder by aerostatic gas bearings.

Figure 6:
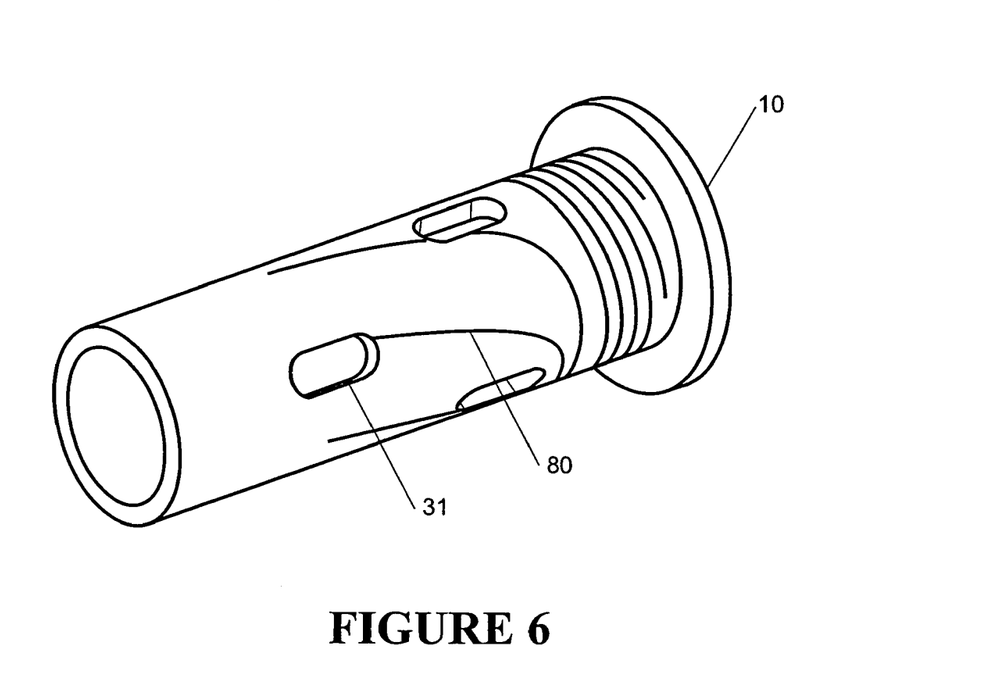
FIG. 6 is a perspective view of a cylinder liner according to one preferred form of the present invention.
Figure 7:
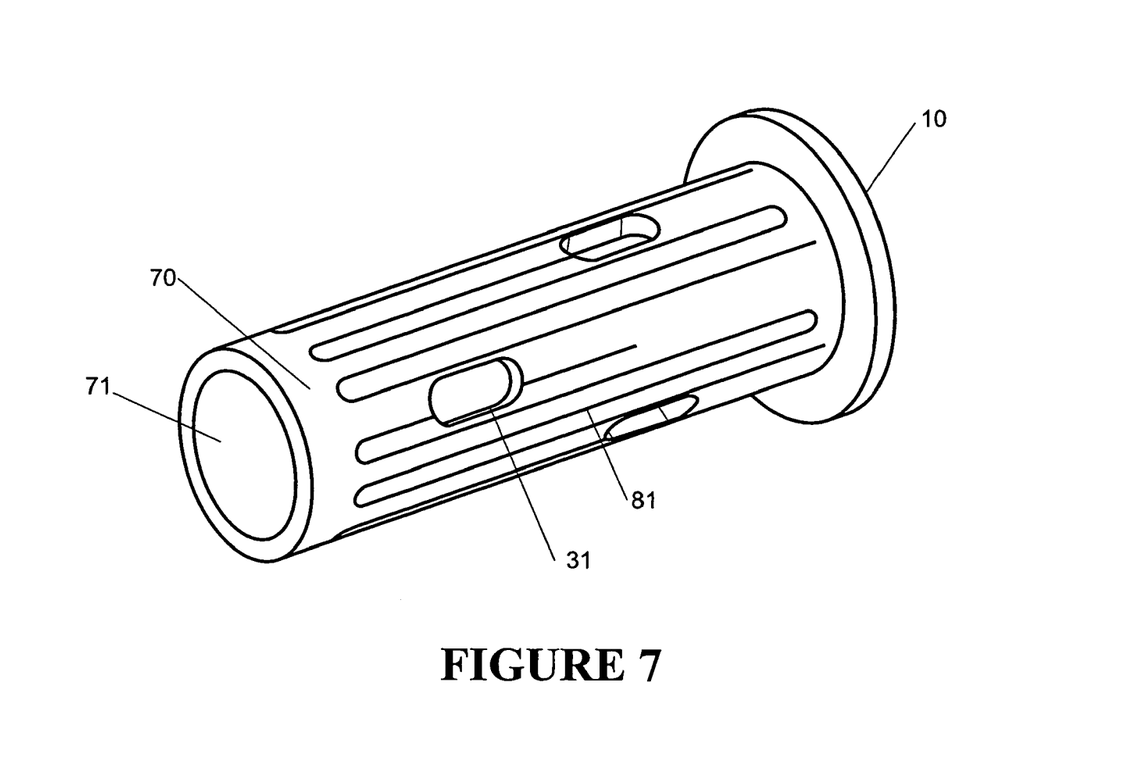
FIG. 7 is a perspective view of a cylinder liner according to a second preferred form of the present invention.

The cylinder part of the compressor includes the cylinder 9, having a bore therethrough, and a cylinder liner 10 within the bore. The cylinder liner 10 may be made from a suitable material to reduce piston wear. For example it may be formed from a fibre reinforced plastic composite such as carbon fibre reinforced nylon with 15% PTFE (preferred), or may be cast iron with the self lubricating effect of its graphite flakes. Referring additionally to FIGS. 6 and 7, the cylinder liner 10 has openings 31 therethrough, extending from the outside cylindrical surface 70 thereof to the internal bore 71 thereof. The piston 11 travels in the internal bore 71, and these openings 31 form the gas bearings. A supply of compressed gas is supplied to the openings 31 by a series of gas bearing passages 8. The gas bearing passages 8 open at their other ends to a gas bearing supply manifold 16, which is formed as an annular chamber around the cylinder liner 10 at the head end thereof between the liner 10 and the cylinder 9. The gas bearing supply manifold 16 is in turn supplied by the compressed gas-manifold 20 of the compressor head by a small supply passage 73. The small size of the supply passage 73 controls the pressure in bearing supply manifold 16, thus limiting the gas consumption of the gas bearings.

The gas bearing passages 8 are formed as grooves 80 or 81 in either the bore 74 of the cylinder or in the outer wall 70 of the cylinder liner. These grooves 80 or 81 combine with the wall of the other cylinder or the cylinder liner to form enclosed passages 8 leading to the openings 31. It will be appreciated that while the grooves could be provided in either part they are more readily formed in the liner part than in the cylinder part, being on an outer surface rather than an inner surface. Being able to machine the grooves into a surface of one or other part rather than having to drill or bore passages is a significant manufacturing improvement.

It has been found that the pressure drop occurring in the gas bearing passages needs to be similar to the pressure drop occurring in the exit flow between the piston and the bore of the cylinder liner. Since the gap between the piston 11 and the cylinder liner bore 71 (for an effective compact compressor) is only 10 to 15 microns, the sectional dimensions of the passages 8 need to be very small, for example, 40 microns deep by 120 microns wide. These small dimensions make manufacturing the bearing passages difficult.

However, with reference to FIGS. 6 and 7, in the preferred embodiment of the present invention matching the pressure drops is made easier by increasing the length of the passages 8 so that the cross-sectional area of the passages can also be increased. The longer but larger cross-section passages have a flow resistance similar to narrower shorter passages. Taking the earlier examples, the dimensions might become 70 microns deep by 200 microns wide. This takes advantage of the ability to form grooves 80 or 81 of any appropriate shape in the surface of the liner part 10 or of the cylinder part 9 which then forms the passages 8 in conjunction with the other part. The grooves can be formed having any path, and if a tortuous path is chosen the length of the grooves can be significantly greater than the direct path between the gas bearing supply manifold and the respective gas bearing forming openings. Two possible options are depicted in FIGS. 6 and 7, being helical paths 80 and serpentine paths 81 respectively. The lengths of the respective paths are chosen in accordance with the preferred cross-sectional area of the passage, which can be chosen for easy manufacture (either machining or possibly by some other form such as precision moulding).

Higher running frequencies reduce motor size but require more spring stiffness, and consequently higher stresses in the springs. Thus it is important for compressor longevity that the highest quality spring material be used. In the conventional linear compressors main springs made from pressed spring steel sheet are often used. However, the edges cut in the pressing operation require careful polishing to regain the original strength of the spring steel sheet.

In the preferred embodiment of the present invention the main spring is formed from circular section music wire. As depicted in first embodiment FIG. 2 the main spring can be wound to form a spiral spring 15. The spiral spring 15 has a pair of spiral arms 50,51 which are 180 degrees out of alignment so that the path of each arm is between adjacent turns of the other arm. The piston mounting point 52 is at the centre of connecting bridge 53 at the centre and the cylinder mounting point 54 for each arm of the spring at the outer end of the arm.

Figure 2:
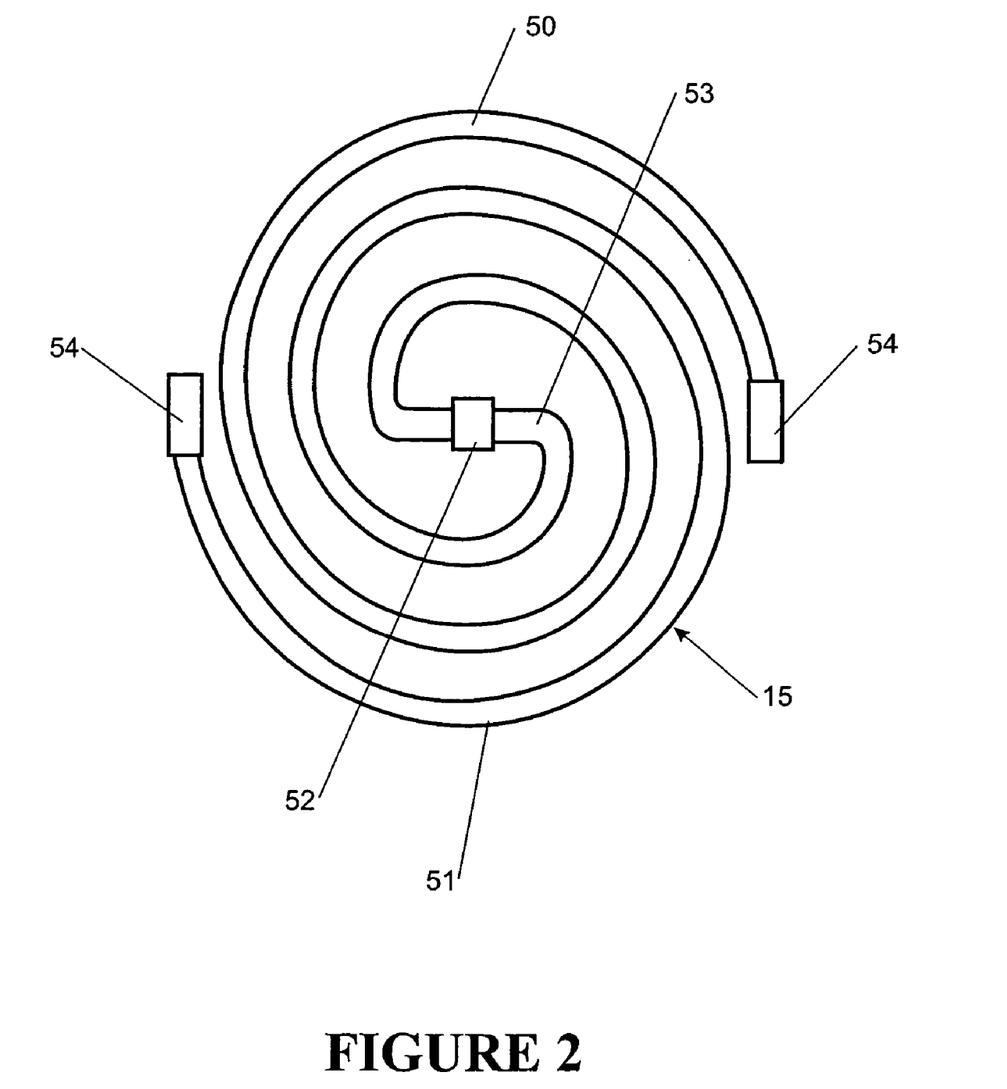
FIG. 2 is a plan view of a first embodiment of a main spring for the linear compressor of FIG. 1.

The very high fatigue strength of music wire is utilised effectively and there is no need for a subsequent polishing operation. If increased lateral stiffness is required the music wire could be deformed by 10% to give an elliptical section. To simplify the attachment of the main spring, square section wire could be used, or the connection ends of the spring may be stamped to a flattened shape, as depicted.

Figure 3:
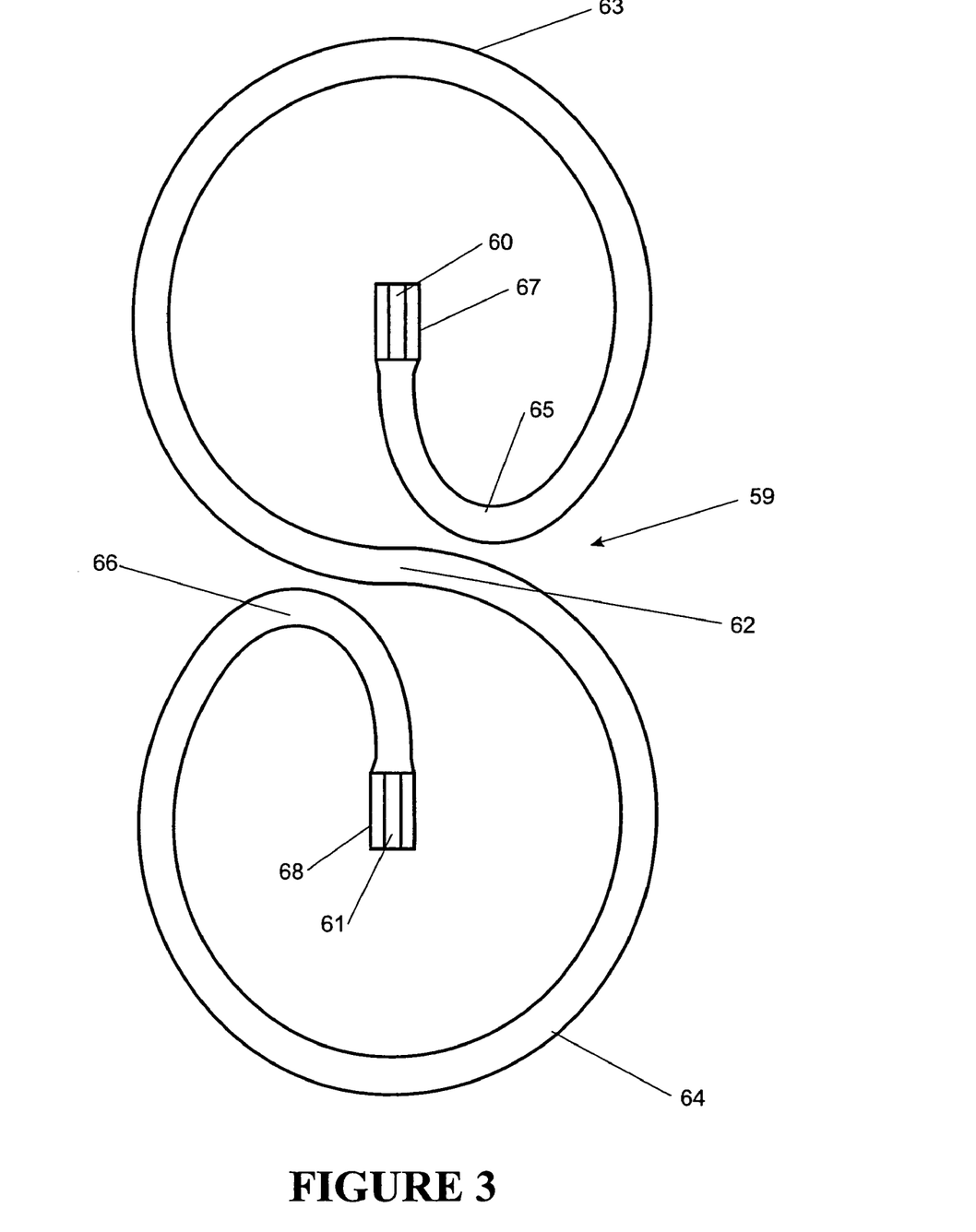
FIG. 3 is a plan view of an alternative second embodiment of the main spring for the linear compressor of FIG. 1.

However, an alternative and second embodiment of the main spring is depicted in FIG. 3. This spring may also be formed from music wire and take advantage of its high fatigue strength.

In FIG. 3 the spring 59 includes a pair of mounting points 60, 61 for mounting to one of the compressor parts (the cylinder part) and a central mounting point 62 for mounting to the other compressor part (the piston part). The spring 59 includes a pair of curved sections 63, 64 of substantially constant radius of curvature which are each centred on a respective cylinder mounting point 60,61. These sections meet in material continuity at the piston mounting point 62. Each section curves smoothly at its other end 65,66 to be radially aligned with the cylinder mounting point 67,68. The sharper transition curve at 65,66 is preferably selected to maintain a substantially even stress distribution along the transition. The cylinder mounting ends 67,68 are preferably aligned with the line between the cylinder mounting points 60,61. To get the best performance for the overall space occupied by the spring, the constant curvature sections 63,64 of the spring 59 are as long as possible. Consequently they extend for approximately 325 degrees from the piston mounting point 62, before curving more sharply to the cylinder mounting point 60 or 61 respectively. This configuration allows the spring sections to narrowly avoid interfering with one another. The total spring assumes an approximate figure-eight shape.

The constant radius curves 63,64 are placed in torsion by the displacement (out of plane) of the piston mounting point 62 relative to the cylinder mounting points 60,61. Being constant radius, the torsion stresses along each of the sections 63,64 are also substantially constant. Due to the radial, or substantially radial direction of the cylinder mounting sections 67,68 any torsion stresses in the portion of the spring at the cylinder mounting are at a minimum and mounting of the spring 59 to the cylinder part is improved. The central mounting point 62 of the spring has high torsion stresses, however this does not significantly complicate mounting because the mounting can be made to encircle the spring arm with a resilient (eg: rubber) boot to allow for movement of the spring arm within the mounting. Movement of the spring arm within the mounting will be cyclical and, due to the symmetry of the spring (the spring is rotationally symmetric through 180 degrees), the cyclic forces should not cause the mounting to creep or walk along the spring arm. It should be noted that this spring configuration has been particularly developed for incorporating the wire formed approach rather than the stamped plate approach. However (subject to limitations in some more complex embodiments referred to below) springs of this geometric form could also be manufactured using the stamped plate method, but some of the advantages for example, uniform stresses are particularly suitable with wire of constant cross section) would not be realised.

It should be appreciated that variations on the spring of FIG. 3 are also possible without departing from the scope of the invention. In particular, if the spring is formed so that a spring arm is perpendicular to the line between the compressor mountings at the compressor mounting then the arm can continue to form an equivalent (although mirrored) loop, below or above a first loop, back to the other compressor mounting. That loop would of course have a second piston connection point below or above the first loop. At the other compressor connection point the ends can meet, or alternatively this second loop may be continued through the connection point to form a third loop, below (or above as necessary) the second loop, back to the first compressor mounting point (or at least to a mounting point immediately above or below). This chaining of loops can proceed to include as many loops as necessary to achieve a required spring constant. Clearly this is a planar spring configuration that cannot be constructed by stamped plate methods.

Figure 4:
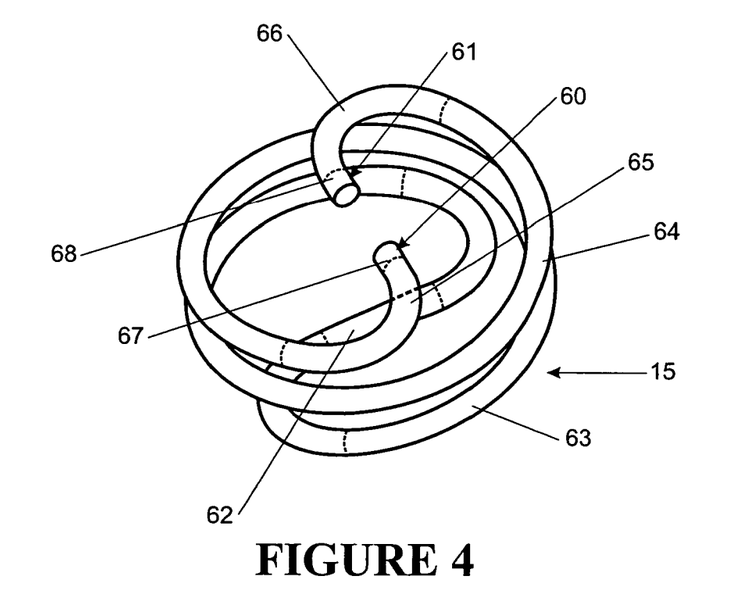
FIG. 4 is a perspective view of a preferred third embodiment of the main spring of the compressor for FIG. 1.
Figure 5:
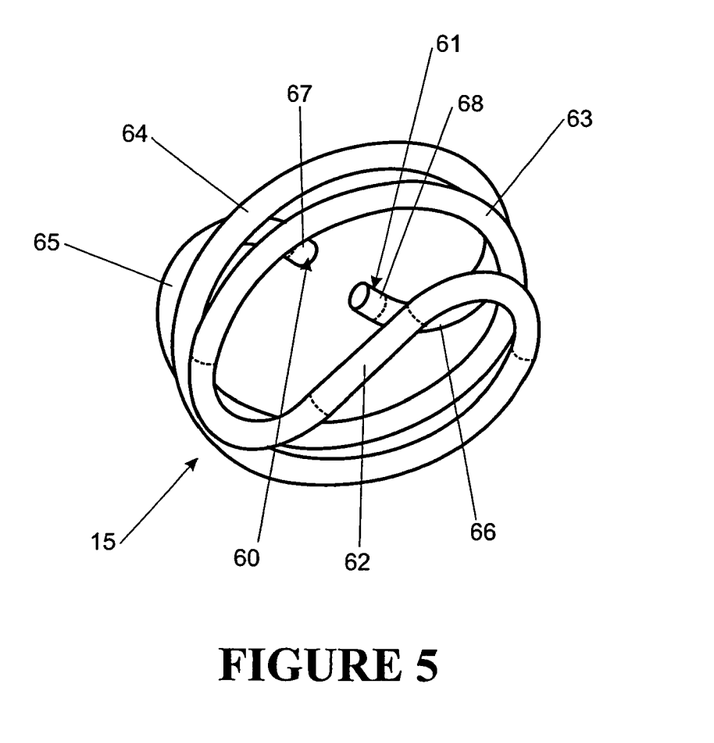
FIG. 5 is a perspective view of the main spring of FIG. 4 from an alternative direction.

However the preferred third embodiment for the main spring is depicted in FIGS. 4 and 5.

In the third embodiment the main spring takes a form other than that of a planar spring. It retains many of the conceptual features of the second embodiment and therefore where similar features are apparent the same reference numerals have been used.

The spring 15 has a pair of free ends for mounting to one of the compressor parts, for example the cylinder part. The spring 15 has a further mounting point for mounting to the piston part.

The spring 15 includes a pair of curved sections 63, 64 of substantially constant radius of curvature which each pass around their respective mounting end. Each of these curved sections extends over a length of approximately 360°. Each section curves smoothly at both of its ends. At the ends 65, 66 they curve such that the lengths 67, 68 of them at the cylinder mounting ends are radially aligned. The sharper transition curve at 65, 66 is selected to maintain a substantially even stress distribution along the transition. The spring 15 of FIGS. 4 and 5 improves on the spring 59 of FIG. 3 in that the constant curvature sections 63, 64 of the spring 15 may be rendered of any degree length, including beyond 360°. In the example depicted they are each of approximately 360° in length.

In the manner depicted in FIGS. 4 and 5 the mounting points 60, 61 of spring 15 are at an upper side thereof. The central mounting point 62 is at a lower side thereof. The constant curved sections 63, 64 each curve smoothly at their lower ends to be radially aligned and continuous with one another across a diameter of the general circle of the spring at the mounting point 62. The alignment of this diameter is substantially perpendicular to the alignment of the ends 67, 68 at the cylinder part mounting points 60, 61.

The constant radius curve 63, 64 are placed in torsion by the displacement of the piston mounting point 62 relative to the mounting points 60, 61. The torsion along each of the sections 63, 64 is also substantially constant. Due to the radial or substantially radial direction of the cylinder mounting sections 67, 68 and the piston mounting point 62, any torsion stresses at the cylinder mounting ends and at the piston mounting point are at a minimum and mounting of the spring 15 to both the cylinder parts and the piston part is improved.

The invention claimed is:

1. A linear compressor comprising: a piston part; a cylinder part reciprocal relative to said piston part; a main spring having at least a pair of first mounting points for securement of said spring to one of said piston part and said cylinder part, and at least one second mounting point for securement to the other of said piston part and said cylinder part, and a spring arm spanning a path between said first mounting points by way of said second mounting point, at least a first section having a curve around one said first mounting point and a second section having a curve around another said first mounting point, said first section and said second section meeting between said first mounting points at said second mounting point.

2. A linear compressor as claimed in claim 1 wherein there are two said first mounting points.

3. A linear compressor as claimed in claim 1 wherein said spring arm includes a section, at each said first mounting point, extending substantially radially from the mounting point.

4. A linear compressor as claimed in claim 1 wherein at said second mounting point the path of said spring arm is perpendicular to a line between said first mounting points.

5. A linear compressor as claimed in claim 1 wherein one or both of said first and second sections extends for greater than 90 degrees about its respective centre.

6. A linear compressor as claimed in claim 5 wherein one or both of said first and second sections extends for greater than 270 degrees about its respective centre.

7. A linear compressor as claimed in claim 5 wherein each of one or both of said first and second sections extend for approximately 135 degrees or 315 degrees about its respective centre before, at the end leading to the respective said mounting point curving more sharply toward said mounting point to, at said mounting point, be in line with the line connecting said first mounting points and at the end thereof leading to said second mounting point said section meets the other of said first and second sections in line therewith.

8. A linear compressor as claimed in claim 1 wherein said spring is rotationally symmetric through a rotation of 180 degrees.

9. A linear compressor as claimed in claim 1 wherein said first mounting points lie in a first plain, said first and second sections of said spring arm include first and second constant curvature helical sections, and said second mounting point lies on a substantially straight diametrical section of said spring arm which connects between said first and second helical sections and lies in a second plain at least substantially parallel to said first plain.

10. A linear compressor as claimed in claim 9 wherein the orientation of said second section in said second plain is perpendicular to the orientation of a line between said first mounting points and said first plain.

11. A linear compressor as claimed in any one of claims 1 and 2 to 10, wherein said first mounting points of said spring are connected to said cylinder part, and said piston part is connected to said spring at said second mounting point.

12. A linear compressor as claimed in any one of claims 1 and 2 to 10, wherein said mounting of said piston part to said spring includes a relatively flexible mounting surrounding or encircling said spring arm at said second mounting point.

13. A linear compressor including:
a cylinder part,
a piston part,
a main spring connecting between said cylinder part and said piston part and operating in the direction of reciprocation of said piston part relative to said cylinder part,
a sealed housing,
a linear electric motor arranged for operation between said cylinder part and said piston part,
a cylinder part spring means connecting between said cylinder part and said housing part and operating in said direction of reciprocation, and
a piston part spring means connecting between said piston part and said housing and operating elastically in said direction of reciprocation, said piston part spring means having a spring constant which is the product of the fraction of said piston part mass to said cylinder part mass and the effective spring constant of said cylinder part spring means acting in said direction of reciprocation.

14. A linear compressor as claimed in claim 13 wherein any said connections from said cylinder part to said housing are elastically deformable and are formed to have, at least in combination, a predictable and low stiffness.

15. A linear compressor as claimed in claim 14 wherein said connections comprise an exhaust conduit carrying compressed refrigerant from said compressor out of said sealed housing, a liquid refrigerant return tube carrying liquid refrigerant to said cylinder part from outside of said sealed housing and any electrical connections to the stator of said linear electric motor.

16. A linear compressor including a spring connecting between a first body and a second body intended to reciprocate along a first direction relative to said first body, said spring comprising:
at least one first mounting point mounted to said first body,
at least one second mounting point mounted to said second body,
a first spring arm connecting between a said first mounting point and a said second mounting point, said first spring arm including a radial section extending substantially perpendicular to said direction of reciprocation, a large radius curve of substantially constant curvature and, between said radial section and said large radius curve, a tighter curve than said large radius curve,
a second spring arm connecting between a said first mounting point and a said second mounting point, said second spring arm including a radial section extending substantially perpendicular to said axis of reciprocation, a large radius curve of substantially constant curvature and, between said radial section and said large radius curve, a tighter curve than said large radius curve,
said first spring arm and said second spring arm each shaped such that for the respective said spring arm, when the shape is projected onto a plane perpendicular to said direction of reciprocation and including said radial section, said radial section extends substantially radially relative to said large radius curve at at least one of the said first mounting point and said second mounting point, with the respective said mounting point at or close to the centre of curvature of said large radius curve.

17. A linear compressor as claimed in claim 16 wherein said curvature of said large radius curve of said first spring arm is substantially the same as the curvature of said large radius curve of said second spring arm.

18. A linear compressor as claimed in claim 16 wherein at least one of said large radius curves curves through an angle of greater than 90.

19. A linear compressor as claimed in claim 18 wherein at least one of said large radius curves curves through an angle of greater than 270 degrees.

20. A linear compressor as claimed in claim 18 wherein each of said large radius curves curves through at least 135 degrees.

21. A linear compressor as claimed in claim 16 wherein said spring is rotationally symmetric through a rotation of 180 degrees.

22. A linear compressor as claimed in claim 16 wherein there are two said first mounting points and one said second mounting point.

23. A linear compressor as claimed in claim 22 wherein at said second mounting point the path of each said spring arm is perpendicular to a line between said first mounting points.

24. A linear compressor as claimed in claim 16 wherein said large radius curve of each said spring arm is substantially helical.

25. A linear compressor as claimed in claim 24 wherein the axes of each helix are parallel.

26. A linear compressor as claimed in claim 24 wherein the axes of each helix are substantially coaxial.

27. A linear compressor as claimed in claim 16 wherein each said first mounting point lies in a first plane and each said second mounting point lies in a second plane at least substantially parallel to said first plane.

28. A linear compressor as claimed in claim 27 wherein a radial section of said first spring arm and a radial section of said second spring arm are aligned and join to be a diametrical portion of said spring, and a single said second mounting point is on said diametrical portion of said spring.

29. A linear compressor as claimed in claim 28 wherein each of said first and second spring arms has a radially extending portion at its respective first mounting point and said radially extending portions are substantially aligned.

30. A linear compressor as claimed in claim 29 wherein the orientation of said diametrical section in said second plane is perpendicular to the orientation of said radially extending portions in said first plane.

31. A linear compressor as claimed in claim 16 wherein said spring comprises a length of high fatigue strength wire of substantially constant section.

32. A linear compressor as claimed in claim 16 wherein each said spring arm comprises only said radial section, said large radius curve, and said tight curve.

33. A linear compressor as claimed in claim 16 wherein each said spring arm consists in, sequentially, a said radial section, a said tighter curve, said large radius curve, a said tighter curve and a said radial section.

34. A linear compressor as claimed in claim 16 wherein said mounting of said piston part to said spring includes a relatively flexible mounting surrounding or encircling said spring arm at said second mounting point.

* * * * *